United States Patent
Bai et al.

(10) Patent No.: US 7,697,228 B2
(45) Date of Patent: Apr. 13, 2010

(54) APPARATUS, SYSTEM, AND METHOD FOR INTERCHANGE TESTING

(75) Inventors: Angqin Bai, Tucson, AZ (US); Kent P. Bortz, Tucson, AZ (US); Shawn O. Brume, Tucson, AZ (US); Lawrence G. Gonzales, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 354 days.

(21) Appl. No.: 11/867,569

(22) Filed: Oct. 4, 2007

(65) Prior Publication Data
US 2009/0091853 A1    Apr. 9, 2009

(51) Int. Cl.
G11B 19/02 (2006.01)
G11B 27/36 (2006.01)
G11B 5/09 (2006.01)
(52) U.S. Cl. ............................. 360/69; 360/71; 360/53; 360/31; 711/111
(58) Field of Classification Search ................. None
See application file for complete search history.

(56) References Cited

U.S. PATENT DOCUMENTS

| 5,894,376 | A | 4/1999 | Rinard ................. 360/77.08 |
| 6,857,044 | B2* | 2/2005 | Beeston et al. ............. 711/111 |
| 7,116,506 | B1 | 10/2006 | Mojica .................... 360/71 |
| 2002/0144048 | A1* | 10/2002 | Bolt ........................ 711/4 |
| 2006/0119962 | A1 | 6/2006 | Bentley et al. ............. 360/31 |
| 2006/0190205 | A1 | 8/2006 | Klein et al. ............... 702/115 |
| 2009/0077310 | A1* | 3/2009 | Ashton et al. ............. 711/111 |

* cited by examiner

Primary Examiner—Andrew L Sniezek
(74) Attorney, Agent, or Firm—Kunzler & McKenzie

(57) ABSTRACT

An apparatus, system, and method are disclosed for interchanging testing. A test module moves a first tape from a tape pool to a first reserved slot of plurality of reserved slots using an accessor. In an embodiment, there is one (1) reserved slot corresponding to each of a plurality of tape drives. Each reserved slot is configured to store one tape for the corresponding tape drive. No other tape drive accesses the stored tape from the reserved slot. Additionally, the test module loads the first tape to a first tape drive from the first reserved slot using the accessor, reads to end of at least two file marks on the first tape using the first tape drive, rewinds to a beginning of the first tape using the first tape drive, spaces forward on the first tape to a beginning of a second of the at least two file marks using the first tape drive, writes specified data to the first tape using the first tape drive, writes a new second file mark to the first tape using the first tape drive, and moves the first tape to the first reserved slot using the accessor.

20 Claims, 6 Drawing Sheets

APPARATUS, SYSTEM, AND METHOD FOR INTERCHANGE TESTING

BACKGROUND OF THE INVENTION

1. Field of the Invention

This invention relates to tape testing and more particularly relates to interchange testing.

2. Description of the Related Art

Magnetic tape is often used to store large amounts of data. Typically a magnetic tape is inserted in a tape drive and data is written to the tape. The magnetic tape is then stored. Later, the magnetic tape may be read from and/or written to another tape drive.

Because magnetic tapes are typically read and written on a plurality of tape drives, it is important that magnetic tapes function over a wide range of tape drive parameters. As a result, manufacturers often perform interchange testing on magnetic tapes. In interchange testing, randomly selected magnetic tapes are tested on a plurality of tape drives one by one.

Unfortunately, the magnetic tapes are not always selected in a truly random way. For example, test plans such as a Whelan matrix prevent samples from being selected truly at random.

SUMMARY OF THE INVENTION

From the foregoing discussion, there is a need for an apparatus, system, and method that tests tape interchange. Beneficially, such an apparatus, system, and method would test interchange of a selected tape on a plurality of tape drives.

The present invention has been developed in response to the present state of the art, and in particular, in response to the problems and needs in the art that have not yet been fully solved by currently available methods for tape testing. Accordingly, the present invention has been developed to provide an apparatus, system, and method for tape interchange testing that overcomes many or all of the above-discussed shortcomings in the art.

The apparatus for interchange testing is provided with a plurality of modules configured to functionally execute the steps of moving a first tape, loading the first tape, reading to end, rewinding to a beginning of the first tape, spacing forward on the first tape, writing specified data, writing a new second file mark, and moving the first tape. These modules in the described embodiments include a plurality of tape drives, a plurality of reserved slots, and a test module.

The plurality of tape drives read data from and writes data to a plurality of tapes. One reserved slot corresponds to each tape drive. Each reserved slot stores one tape for the corresponding tape drive. No other tape drive accesses the stored tape from the reserved slot.

The test module tests a first tape. The testing of the first tape comprises moving the first tape from a tape pool to a first reserved slot. In addition, the test module loads the first tape to a first tape drive from the first reserved slot and reads to end of at least two file marks on the first tape. The test module further rewinds to a beginning of the first tape and spaces forward on the first tape to a beginning of a second of the at least two file marks. In addition, the test module writes specified data to the first tape, writes a new second file mark to the first tape, and moves the first tape to the first reserved slot.

A system of the present invention is also presented for interchange testing. In particular, the system, in one embodiment, includes an automated tape library. The automated tape library (ATL) includes a plurality of tape drives, a tape pool, a plurality of reserved slots, an accessor, and a library manager. The library manager includes a test module.

The plurality of tape drives read data from and writes data to a plurality of tapes. The tape pool stores tapes. The ATL includes a plurality of reserved slots. One reserved slot corresponds to each tape drive. Each reserved slot stores one tape for the corresponding tape drive. No other tape drive accesses the stored tape from the reserved slot.

The accessor transports a tape between the tape pool, a reserved slot, and a tape drive. The library manager manages the accessor and the tape drives. The library manager comprises a test module. The test module tests a first tape. The testing of the first tape comprises moving the first tape from a tape pool to a first reserved slot, loading the first tape to a first tape drive from the first reserved slot, reading to end of at least two file marks on the first tape, rewinding to a beginning of the first tape, spacing forward on the first tape to a beginning of a second of the at least two file marks, writing specified data to the first tape, writing a new second file mark to the first tape, and moving the first tape to the first reserved slot.

A method of the present invention is also presented for interchange testing. The method in the disclosed embodiments substantially includes the steps to carry out the functions presented above with respect to the operation of the described apparatus and system. In one embodiment, the method includes moving a first tape, loading the first tape, reading to end, rewinding to a beginning of the first tape, spacing forward on the first tape, writing specified data, writing a new second file mark, and moving the first tape.

A test module moves a first tape from a tape pool to a first reserved slot of plurality of reserved slots using an accessor. In an embodiment, there is one reserved slot corresponding to each of a plurality of tape drives. Each reserved slot is configured to store one tape for the corresponding tape drive. No other tape drive accesses the stored tape from the reserved slot.

Additionally, the test module loads the first tape to a first tape drive from the first reserved slot using the accessor, reads to end of at least two file marks on the first tape using the first tape drive, rewinds to a beginning of the first tape using the first tape drive, spaces forward on the first tape to a beginning of a second of the at least two file marks using the first tape drive, writes specified data to the first tape using the first tape drive, writes a new second file mark to the first tape using the first tape drive, and moves the first tape to the first reserved slot using the accessor.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, a system, and a method for tape interchange testing. Beneficially, such an apparatus, a system, and a method would do truly random selection of one tape at a time among a plurality of tapes and further would test the selected magnetic tape on a plurality of tape drives. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
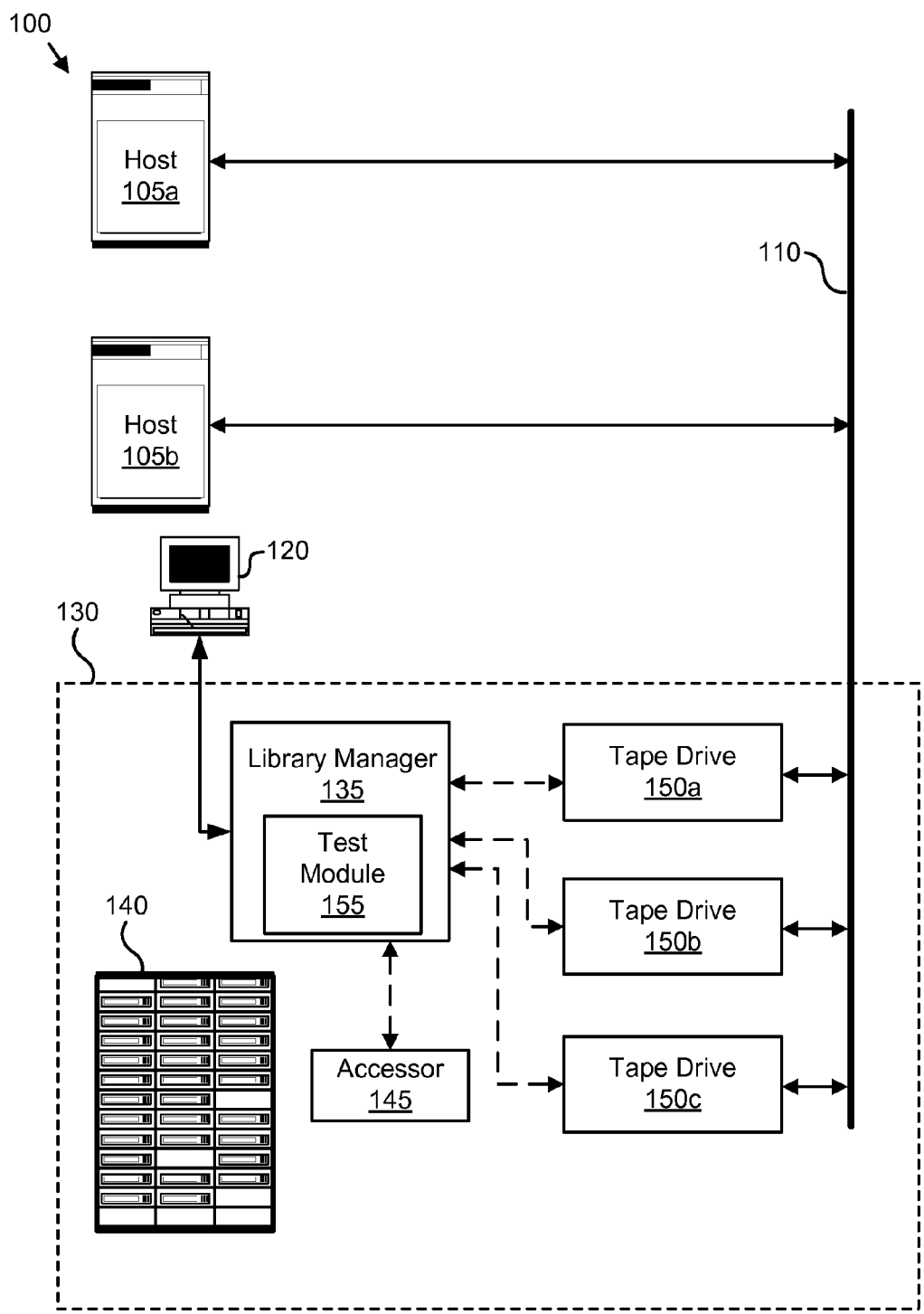
FIG. 1 is a schematic block diagram illustrating one embodiment of a system for interchange testing in accordance with the present invention.

FIG. 1 is a schematic block diagram illustrating one embodiment of a system 100 for interchange testing in accordance with the present invention. The system 100 includes a plurality of hosts 105a-b, an internal network 110, a computer 120, and an ATL 130. Although for simplicity, two (2) hosts 105a-b, one (1) internal network 110, and one (1) ATL 130 are shown, any number of those may be employed in the system 100.

In the shown embodiment, the ATL 130 includes a plurality of tape drives 150a-c, an accessor 145, a slot matrix 140, and a library manager 135. The library manager 135 includes a test module 155. The plurality of tape drives 150a-c read data from and writes data to a plurality of tapes.

The library manager 135 manages the accessor 145 and the tape drives 150a-c. The library manager 135 may control inventory of the plurality of the tapes. The library manager 135 may be a computer readable program. The library manager 135 comprises a test module 155. The test module 155 tests a first tape.

The plurality of hosts 105a-b may be mainframe computers, blade centers comprising multiple blade servers with high-speed processors, and the like. The plurality of hosts 105a-b may have an ability to run or host multiple operating systems. For example, the plurality of hosts 105a-b may run or host multiple operating systems such Linux, Solaris, MICROSOFT WINDOWS® or the like. The computer 120 may be a desktop, laptop, palmtop, or the like. As used herein, the computer 120 is referred to as a client 120. A user may initiate necessary commands for interchange testing of the tape on the plurality of tape drives 150a-c using the computer 120.

On receiving the necessary commands, the plurality of hosts 105a-b may initiate and run all input/output (I/O) and other operations such as reading data from or writing the data to the tape, rewinding the tape, spacing forward the tape, or the like. The tape may be configured as a magnetic tape. The plurality of hosts 105a-b may communicate over the internal network 110 with the plurality of tape drives 150a-c to run all input/output (I/O) and other operations. The internal network 110 may be a local area network (LAN), a wide area network (WAN), or the like. The internal network 110 may use Network Interface Cards (NICs), Bridges, Hubs, Switches, Routers, or the like for communication. All communication between the computer 120, the plurality of hosts 105a-b, the internal network 110, and the ATL 130 may be through cables, wires, optical fibres, fabric, or the like, and/or wireless.

The tape may be stored on a first reel within a cartridge (not shown). The cartridge may be a self contained, removable unit that may contain the readable/writable (R/W) tape. Each cartridge may have a least two identifiers such as a logical volume identifier and a cartridge identifier. These identifiers may be the like known to those skilled in the art. The system 100 may include a plurality of cartridges and a plurality of tapes. For example, the first and third cartridge may have the cartridge identifier CDE164 and CDE166 respectively and the first tape may have the logical volume identifier TPE789.

When the data is read from and/or written to the tape, a proximal end of the tape may be spooled from a first reel to a second reel. Servos may motivate the first and second reels to move the tape across a head. The head may include read and write elements that may read magnetically encoded data from and write magnetically encoded data to the tape. The tape drive 150 may magnetically encode the data by methods known to those skilled in the art.

The slot matrix 140 may include a tape pool and a plurality of slots. The tape pool is configured to store tapes. Each slot may provide space that may contain the cartridge. Some slots of the plurality of slots may be configured as reserved slots. In a particular embodiment, there is one reserved slot corresponding to each tape drive 150a-c. For example, there may be one first reserved slot for the tape drive 150a.

Each reserved slot is configured to store one tape for the corresponding tape drive 150. For example, the first reserved slot may be configured to store the first tape stored in the cartridge for the corresponding tape drive 150a. No other tape drive accesses the stored tape from the reserved slot. For example, the tape drives 150b-c may not access the stored first tape from the first reserved slot that is configured to store the first tape for the tape drive 150a.

The accessor 145 may be a mechanism for detecting, gripping, removing, and transporting the cartridge between the slots, tape drives 150a-c and other elements of the ATL 130. In a particular embodiment, the accessor 145 is configured to transport the tape between the tape pool, the reserved slot, and the tape drive 150. For example, the accessor 145 may transport the first tape between the tape pool, the first reserved slot, and the tape drive 150a. The accessor 145 may be a mechanical manipulator configured to grasp and transport the tape as is well known to those skilled in the art.

Every standard reel of the tape designed for digital computer use may have two reflective markers such as beginning-of-tape (BOT) position marker and end-of-tape (EOT) position marker located on the back side of the tape (opposite the recording surface). The tape drive 150 may sense their position on the tape. The 'BOT' position marker may signal a start of recorded information. The 'EOT' position marker may not essentially indicate an end of recorded information, but in most of cases may indicate that the remaining tape supply is running low. The data may be recorded beyond 'EOT' position marker.

The data to be stored onto the tape may be in the form of one or more files. The files may be created by methods known to those skilled in the art. The files may be stored onto the tape by writing each file sequentially one by one, one file at a time. The file may comprise one or more records. One record may be separated from another by an inter-record gap in the form of a blank space, a tape mark, and or a file mark.

One file may be separated from another by the file mark. The file mark may be sandwiched between two inter-file gaps. After one file is written onto the tape, another file may be written onto the tape in the same manner, and so forth. For example, a first file may be separated by the first file mark sandwiched between two inter-file gaps from a second successive file. The second successive file may be separated from another third successive file by the second file mark sandwiched between two inter-file gaps and so on. A computer program may automatically create the inter-record gaps, the tape marks, and/or the inter-file gaps using the tape drive 150.

The sequentially written files may be retrieved from the tape one by one sequentially. The tape may have a long latency for random accesses since the deck of the tape must wind an average of one-third the tape length to move from one arbitrary data block to another. The intrinsic long latency may be alleviated either using an indexing or marking the blocks with the file marks. In indexing a separate lookup table in the form of a tape directory may be maintained that may provide the physical tape location for a given data block number. Alternatively, the marking blocks with file marks may be detected while winding the tape at high speed.

It is important that each tape can be properly written to and read from by each tape drive 150a-c. As a result, interchange testing is frequently used to test tapes and/or tape drives 150a-c. For example, a randomly selected sample of tapes may be tested in one or more tape drives 150a-c. The present invention improves interchange testing as will be described hereafter.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2A:
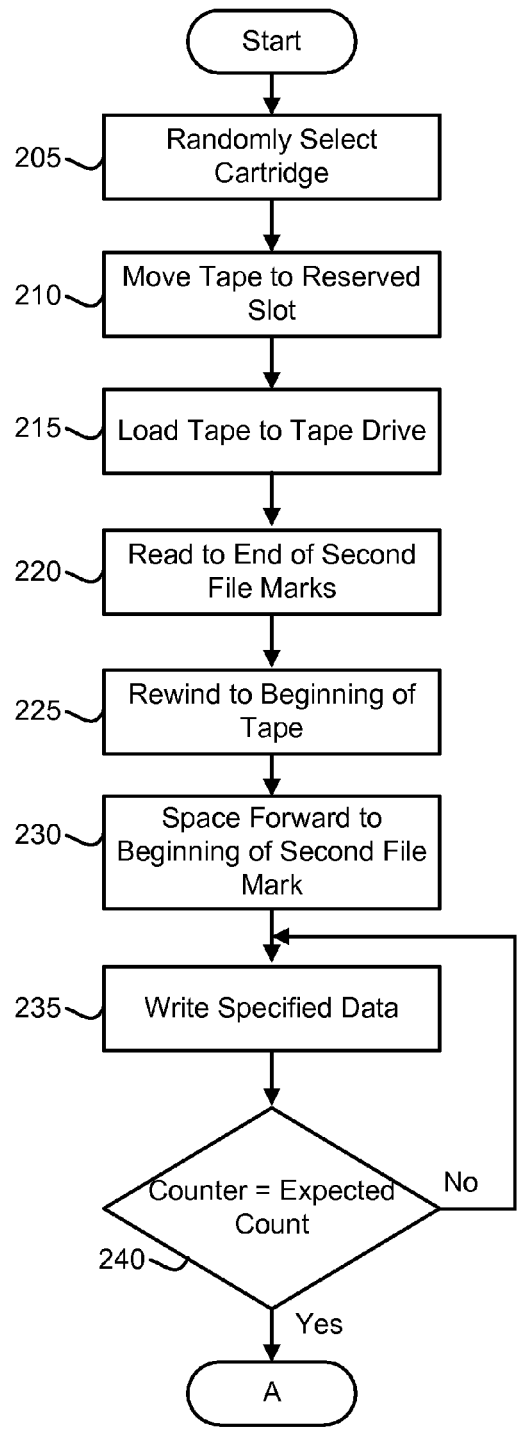
FIGS. 2A and 2B are schematic flow charts illustrating one embodiment of a method for interchange testing of the present invention.
Figure 2B:
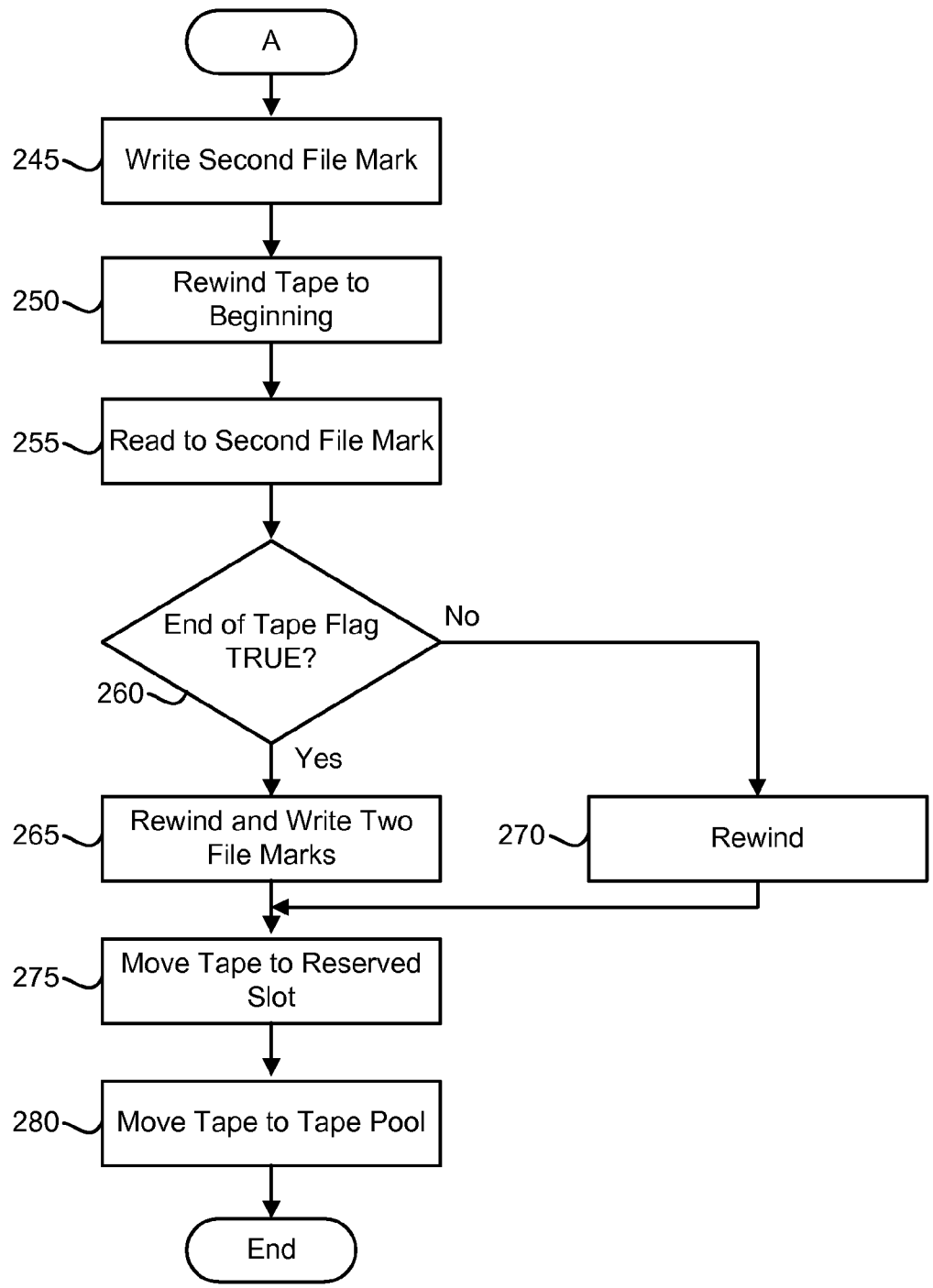

FIGS. 2A and 2B are schematic flow charts illustrating one embodiment of a method 200 for interchange testing. The method 200 substantially includes the steps to carry out the process of the present invention. The description of method 200 refers to elements of FIG. 1, like numbers referring to like elements. In one embodiment, the method 200 is implemented with a computer program product comprising a computer readable medium having a computer readable program. The computer program product in combination with the computing system may be capable of performing the method 200. The computer program readable medium may be executed by plurality of hosts 105a-b and/or library manager 135.

The method 200 starts, and in an embodiment, the library manager 135 randomly selects 205 a cartridge. For example, the library manager 135 may randomly select 205 the cartridge having the cartridge identifier CDE164.

The test module 155 moves 210 a first tape from a tape pool to a first reserved slot of a plurality of reserved slots using the accessor 145. The tape pool may comprise the tapes in the slot matrix 140. In an embodiment, there is one reserved slot corresponding to each of a plurality of tape drives 150a-c. Each reserved slot is configured to store one tape for the corresponding tape drive 150. No other tape drive 150 accesses the stored tape from the reserved slot. For example, the test module 155 may automatically move 210 the first tape from the tape pool to the first reserved slot using the accessor 145. The first reserved slot may provide space for storing the selected cartridge having the cartridge identifier CDE164.

The test module 155 loads 215 the first tape to a first tape drive 150 from the first reserved slot using the accessor 145. The first tape drive 150 may be tape drive 150a of FIG. 1. For example, the test module 155 may automatically create a load command 'LOAD FIRSTTAPE.' On receiving the command, the accessor 145 may load 215 the first tape to the first tape drive 150a. The accessor 145 may physically transport the first tape stored in the first cartridge between the first reserved slot and the first tape drive 150a.

The test module 155 reads 220 to end of at least two file marks on the first tape using the first tape drive 150a. The at least two marks the first tape may be the first and second file marks described in description of FIG. 1. For example, the test module 155 may automatically create a command 'read-ahead fms2.' On receiving the command, the first tape drive 150a may read the data to a second file-gap after the second file mark on the first tape. The read data may include the first and second file, the plurality file-gaps, and the plurality of file marks. Further the read data may be stored in a volatile memory of one of the plurality of hosts 105a-b.

In an embodiment, the test module 155 detects a read error. For example, the test module 155 may detect the read error if the first tape drive 150a reads the 'EOT' position mark before the at least second file mark. Alternatively, the error may be a data error.

The test module 155 rewinds 225 to a beginning of the first tape using the first tape drive 150a. For example, the test module 155 may automatically create a command 'asf.' On receiving the command, the first tape drive 150a may rewind 225 the first tape to the 'BOT' position mark.

The test module 155 spaces forward 230 on the first tape to the beginning of the second of the at least two file marks using the first tape drive 150a. For example, the test module 155 may automatically create a command 'fsfm2.' On receiving the command, the first tape drive 150a may space forward 230 on the first tape to the first inter-file gap of the second file mark.

The test module 155 writes 235 specified data to the first tape using the first tape drive 150a. For example, the test module 155 may automatically create a command 'wsdata.' On receiving the command, the first tape drive 150a may automatically retrieve the data from the volatile memory of one of the plurality of hosts 105a,b and further may write 235 the retrieved data to the first tape. The data may be a test pattern as is well known to those of skill in the art.

The test module 155 may determine 240 if a counter is equal to expected count. The expected count may be four (4) corresponding to writing four data blocks and four file marks during an interchange test. For example, the test module 155 may determine 240 whether the counter equals four (4) count or not. A count of four (4) may indicate that the interchange test is completed.

If the test module 155 determines 240 that the counter does not equal to the expected count, the method 200 loops to step 235. If the test module 155 determines 240 that the counter equals to the expected count, the test module 155 writes 245 a new second file mark to the first tape using the first tape drive 150a as shown in FIG. 2B. For example, the test module 155 may receive a signal indicating the counter equal to four (4), the test module 155 may create a command 'wsfmB1.' On receiving the command, the first tape drive 150a may automatically write 245 the new second file mark 'B1' to the first tape.

The test module 155 may further rewind 250 the first tape using the first tape drive 150a. For example, the test module 155 may automatically create a command 'asf.' On receiving the command, the first tape drive 150a may rewind 250 the first tape to the 'BOT' position mark.

The test module 155 may further read 255 the first tape to the new at least second file mark first using the first tape drive 150a. For example, the test module 155 may automatically create a command 'read-ahead fms4.' On receiving the command, the first tape drive 150a may read the data to a second file-gap after the second file mark 'B1' on the first tape.

The test module 155 may determine 260 if an end of tape flag is true. The end of tape flag may be the 'EOT' position mark on the first tape. For example, the test module 155 may receive a signal indicating 'EOT' position mark to determine 260 that end of tape flag is reached. In another example, the test module 155 may receive a signal not indicating 'EOT' position mark to determine 260 that end of tape flag is not reached.

If the test module 155 determines 260 that the end of tape flag is not true, the method loops to step 275. If the test module 155 determines 260 that the end of tape flag is true, the test module 155 may further rewind the first tape using the first tape drive 150a and write 265 at least two file marks to the first tape using the first tape drive 150a. For example, in response to the signal indicating end of tape flag true, the test module 155 may further rewind and write 265 sequentially two new successive file marks.

If the test module 155 determines 260 that the end of tape flag is not true, the test module 155 may further rewind 270 the first tape using the first tape drive 150a. For example, the test module 155 may automatically create a command 'asf.' On receiving the command, the first tape drive 150a may rewind 270 the first tape to the 'BOT' position mark and the method continues to step 275.

The test module 155 may further unload 275 the first tape to the first reserved slot using the accessor 145. For example, the test module 155 may create a command 'UNLOAD TAPE.' On receiving the command, the accessor 145 may unload 275 the first tape having the logical volume identifier TPE789. The test module 155 may further move 280 the first tape to the tape pool using the accessor 145. For example, the test module 155 may issue a command 'MOVE TAPEPOOL.' On receiving the command the accessor 145 may move 280 the first tape to the tape pool.

In an embodiment, the test module 155 tests the first tape on at least one other tape drive 150. For example, the test module 155 may test the first tape on the tape drive 150b or the tape drive 150c by the method 200 before moving the first tape to the tape pool. Thus the method 200 would do truly random selection of one tape at a time among a plurality of tapes and further would test the selected tape on the plurality of tape drives 150a-c.

Figure 3:
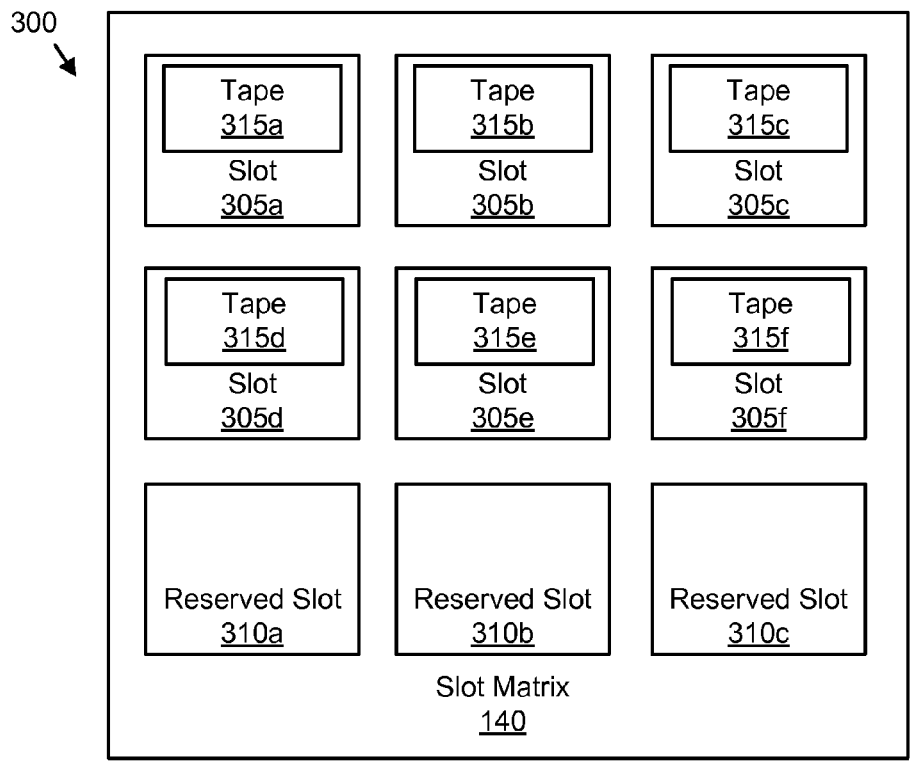
FIG. 3 is a schematic block diagram illustrating one embodiment of a tape system of the present invention.
Figure 3:
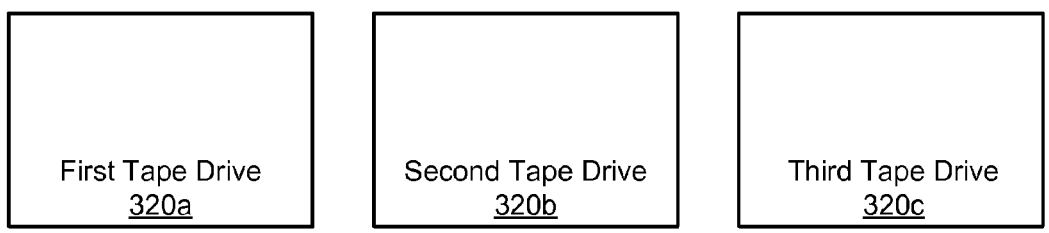

FIG. 3 is a schematic block diagram illustrating one embodiment of a tape system 300 of the present invention. The tape system 300 includes a slot matrix 140 and a plurality of tape drives 320a-c. The description of FIG. 3 refers to elements of FIGS. 1, 2A, and 2B, like numbers referring to like elements. Although, for simplicity only three (3) tape drives 320a-c and one (1) slot matrix 140 are shown, any number of those may be employed in the tape system 300.

The slot matrix 140 and the plurality of tape drives 320a-c may be the slot matrix 140 and the plurality of tape drives 150a-c of FIG. 1 respectively. In the shown embodiment, the slot matrix 140 includes a plurality of slots 305a-f and a plurality of reserved slots 310a-c. Each slot 305 may hold one tape 315. For example, a first slot 305a may hold a corresponding first tape 315a. The plurality of slots 305a-f and the plurality of tapes 315a-f may configure a tape pool. Additionally, in the shown embodiment, each reserved slot 310a-c corresponds to the tape drive 320a-c.

Figure 4:
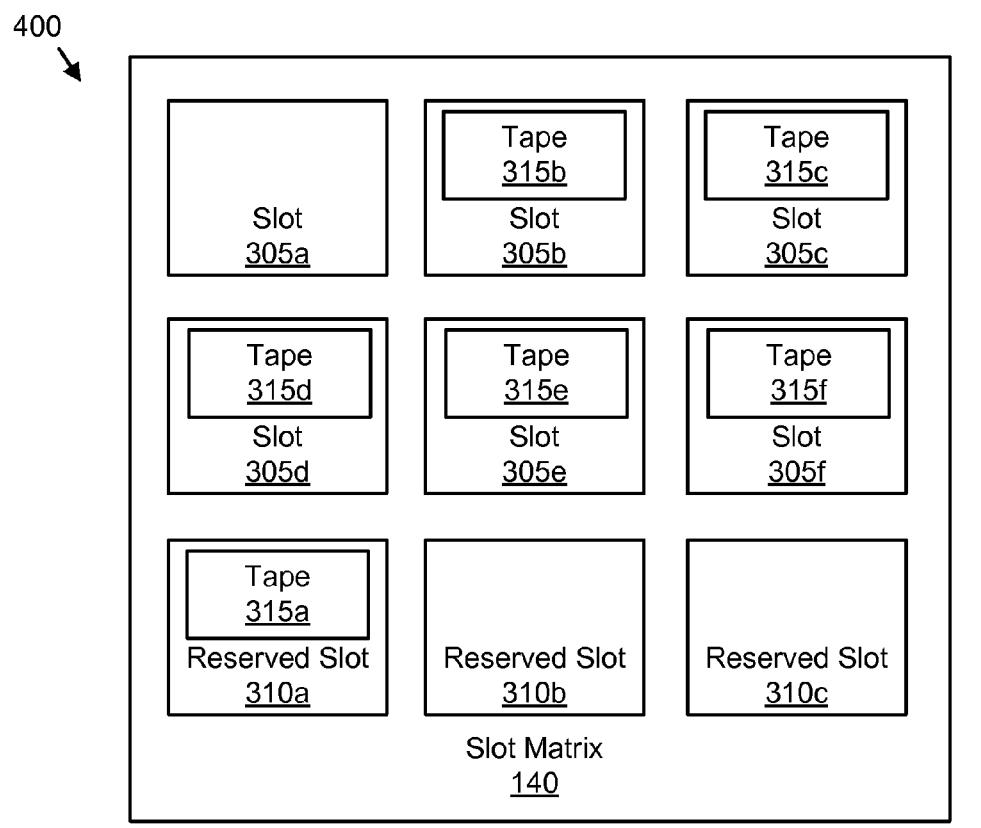
FIG. 4 is a schematic block diagram illustrating another embodiment of the tape system.
Figure 4:
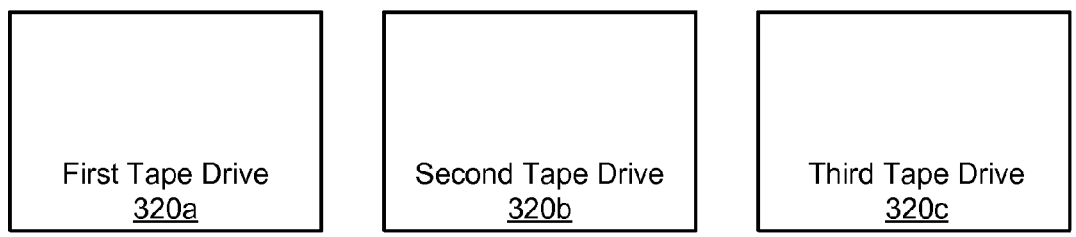

FIG. 4 is a schematic block diagram illustrating another embodiment of the tape system 400 of the present invention. The tape system 400 may be the tape system 300 of FIG. 3, wherein a first tape 315a is moved from a tape pool to a first reserved slot 310a.

The test module 155 may issue a command to move the first tape 315a from the tape pool to the first reserved slot 310a. The accessor 145 may physically move the first tape 315a to load the first tape 315a to the first reserved slot 310a.

Figure 5:
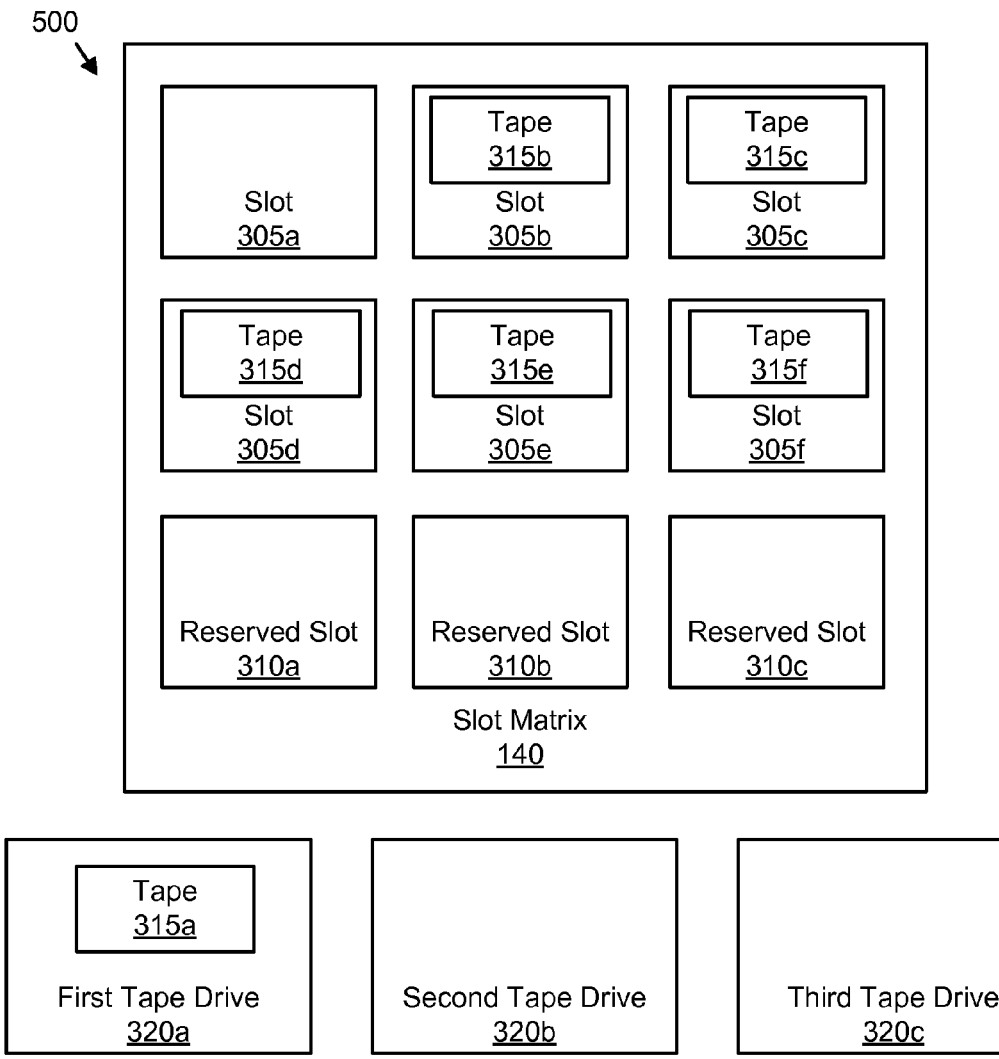
FIG. 5 is a schematic block diagram illustrating one more embodiment of the tape system.

FIG. 5 is a schematic block diagram illustrating one more embodiment of the tape system 500. The tape system 500 may be the tape system 400 of FIG. 4, wherein the first tape 315a is moved from the first reserved slot 310a to the first tape drive 320a of the present invention.

The test module 155 may issue a command to move the first tape 315a from the first reserved slot 310a to the first tape drive 320a. On receiving the command, the accessor 145 may physically move the first tape 315a to load the first tape 315a to the first tape drive 320a from the first reserved slot 310a.

The present invention provides an apparatus, a system, and a method for tape interchange testing. Beneficially, such an apparatus, a system, and a method would do truly random selection of one tape at a time among a plurality of tapes and further would test the selected magnetic tape on a plurality of tape drives. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for interchange testing, the apparatus comprising:
    a plurality of tape drives configured to read data from and write data to a plurality of tapes;
    a plurality of reserved slots, one reserved slot corresponding to each tape drive, each reserved slot configured to store one tape for the corresponding tape drive, wherein no other tape drive accesses the stored tape from the reserved slot; and
    a test module comprising a computer readable program stored on a tangible storage device, executed by a processor and configured to test a first tape, the test comprising
        moving the first tape from a tape pool to a first reserved slot;
        loading the first tape to a first tape drive from the first reserved slot;
        reading to end of at least two file marks on the first tape;
        rewinding to a beginning of the first tape;
        spacing forward on the first tape to a beginning of a second of the at least two file marks;
        writing specified data to the first tape;
        writing a new second file mark to the first tape; and
        moving the first tape to the first reserved slot.

2. The apparatus of claim 1, the test further comprising:
    rewinding the first tape;
    reading the first tape to the new at least second file mark;
    rewinding the first tape and writing at least two file marks to the first tape if an end of tape flag is true else rewinding the first tape; and
    unloading the first tape to the first reserved slot.

3. The apparatus of claim 2, the test further comprising:
    loading the first tape from the first reserved slot to the first tape drive;
    reading the first tape to the beginning of the new second file mark; and
    unloading the first tape to the first reserved slot.

4. The apparatus of claim 1, wherein the test further comprises moving the first tape to the tape pool.

5. The apparatus of claim 1, wherein the test module is further configured to test the first tape on at least one other tape drive.

6. The apparatus of claim 1, where the test module moves, loads, and unloads the first tape using an accessor configured to transport a tape between the tape pool, a reserved slot, and a tape drive.

7. The apparatus of claim 1, wherein the test module is further configured to detect a read error and communicate information on the read error.

8. A computer program product comprising a computer useable medium having a computer readable program, wherein the computer readable program when executed on a computer causes the computer to:
    move a first tape from a tape pool to a first reserved slot of a plurality of reserved slots using an accessor, one reserved slot corresponding to each of a plurality of tape drives, each reserved slot configured to store one tape for the corresponding tape drive, wherein no other tape drive accesses the stored tape from the reserved slot;
    load the first tape to a first tape drive from the first reserved slot using the accessor;
    read to end of at least two file marks on the first tape using the first tape drive;
    rewind to a beginning of the first tape using the first tape drive;
    space forward on the first tape to a beginning of a second of the at least two file marks using the first tape drive;
    write specified data to the first tape using the first tape drive;
    write a new second file mark to the first tape using the first tape drive; and
    move the first tape to the first reserved slot using the accessor.

9. The computer program product of claim 8, wherein the computer readable program is further configured to cause the computer to:
    rewind the first tape using the first tape drive; and
    read the first tape to the new at least second file mark using the first tape drive.

10. The computer program product of claim 9, wherein the computer readable program is further configured to cause the computer to:
    rewind the first tape using the first tape drive;
    write at least two file marks to the first tape if an end of tape flag is true else rewind the first tape using the first tape drive; and
    unload the first tape to the first reserved slot using the accessor.

11. The computer program product of claim 10, wherein the computer readable program is further configured to cause the computer to:
    load the first tape from the first reserved slot to the first tape drive using the accessor;
    read the first tape to the beginning of the new second file mark using the first tape drive; and
    unload the first tape to the first reserved slot using the accessor.

12. The computer program product of claim 11, wherein the computer readable program is further configured to cause the computer to move the first tape to the tape pool using the accessor.

13. The computer program product of claim 8, wherein the computer readable program is further configured to cause the computer to test the first tape on at least one other tape drive.

14. The computer program product of claim 8, wherein the computer readable program is further configured to cause the computer to detect a read error.

15. A system for interchange testing, the system comprising:
- an automated tape library comprising
- a plurality of tape drives configured to read data from and write data to a plurality of tapes;
- a tape pool configured to store tapes;
- a plurality of reserved slots, one reserved slot corresponding to each tape drive, each reserved slot configured to store one tape for the corresponding tape drive, wherein no other tape drive accesses the stored tape from the reserved slot; an accessor configured to transport a tape between the tape pool, the reserved slot, and the tape drive; and
- a library manager configured to manage the accessor and the tape drives and comprising a test module configured to test a first tape, the test comprising moving a first tape from a tape pool to a first reserved slot;
loading the first tape to a first tape drive from the first reserved slot;
reading to end of at least two file marks on the first tape;
rewinding to a beginning of the first tape;
spacing forward on the first tape to a beginning of a second of the at least two file marks;
writing specified data to the first tape;
writing a new second file mark to the first tape; and
moving the first tape to the first reserved slot.

16. The system of claim 15, the test further comprising:
rewinding the first tape;
reading the first tape to the at least second file mark; and
rewinding the first tape.

17. The system of claim 16, the test further comprising:
writing at least two file marks to the first tape if an end of tape flag is true else rewinding the first tape; and
unloading the first tape to the first reserved slot.

18. The system of claim 17, the test further comprising:
loading the first tape from the first reserved slot to the first tape drive;
reading the first tape to the beginning of the new second file mark; and
unloading the first tape to the first reserved slot.

19. The system of claim 15, wherein the test further comprises moving the first tape to the tape pool.

20. The system of claim 15, wherein the test module is further configured to test the first tape on at least one other tape drive.

* * * * *